A. G. WITT.
SHOCK ABSORBER.
APPLICATION FILED NOV. 8, 1917.

1,276,151.

Patented Aug. 20, 1918.

Inventor
Arthur George Witt.
By
Fitherstonhaugh & Co.
attys.

UNITED STATES PATENT OFFICE.

ARTHUR GEORGE WITT, OF HAMILTON, ONTARIO, CANADA.

SHOCK-ABSORBER.

1,276,151.  Specification of Letters Patent.  Patented Aug. 20, 1918.

Application filed November 8, 1917. Serial No. 200,945.

*To all whom it may concern:*

Be it known that I, ARTHUR GEORGE WITT, of the city of Hamilton, in the county of Wentworth, in the Province of Ontario, Canada, have invented certain new and useful Improvements in Shock-Absorbers, of which the following is the specification.

My invention relates to improvements in shock absorbers and the object of the invention is to devise a shock absorber adaptable to automobiles, motorcycles, bicycles and other vehicles and which will have a pneumatic cushion effect thereby gradually absorbing the shock and at the same time provide means which will eliminate the danger of blow-out in the cushion of the absorber and it consists essentially of the following arrangement and construction of parts as hereinafter more particularly explained.

In the drawings like letters of reference indicate corresponding parts in the various figures.

Figure 1:
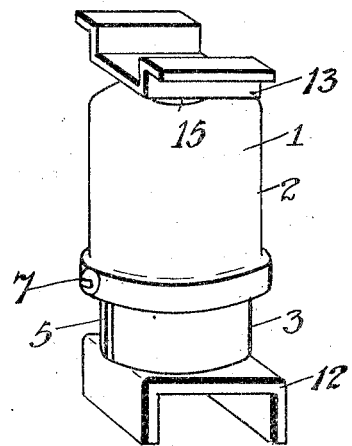
Figure 1 is a general perspective view of my absorber.
Figure 2:
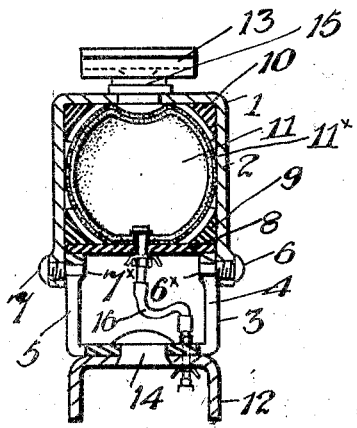
Fig. 2 is a vertical section through Fig. 1.
Figure 3:
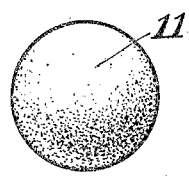
Fig. 3 is a detail of my ball cushion.

1 indicates the absorber casing comprising an upper cylindrical member 2 having an open lower end into which telescopically fits a lower cylindrical member 3. The member 3 is provided with vertical slots 4 and 5. 6 and 7 indicate screws which extend through the upper cylindrical member 2 in proximity to its lower edge, the screws 6 and 7 being provided at their inner ends with pin extensions 6× and 7× fitting into the slots 4 and 5.

8 indicates a circular plate which rests upon the upper edge of the lower cylindrical member 3 within the upper cylindrical member 2.

9 and 10 indicate cup rings, which fit in the upper cylindrical member the cup ring 10 fitting at the upper end of the cylindrical member 2 and the lower cup ring 9 resting upon the plate 8.

11 indicates a ball cushion which is preferably in the form of hollow rubber having an outer reinforcement of canvas 11× and is similar to the construction employed in tennis balls. The cushion ball 11 is inserted within the upper cylindrical member 2 between the plate 8 and cup ring member 9 and the upper end of the cylindrical member and the cup ring member 10.

12 and 13 indicate brackets by which the shock absorber is connected respectively to the opposing members of a vehicle, such as the axle and body of the vehicle, the bracket 12 being connected by a rivet 14 to the lower end of the member 3 and the bracket 13 being connected by a rivet 15 to the upper end of the member 2.

It will thus be seen that when a shock occurs upon the vehicle that the members 2 and 3 will have a tendency to telescope one within the other thereby compressing the cushion ball, which absorbs the shock, the walls of the ball of the cushion as they are forced outwardly by compression bearing upon the inner faces of the cap rings 9 and 10 forming a supporting bearing for the wall of the ball preventing any tendency of its blowing out.

During this movement the parts are held together by the pins 6× and 7× extending into the slots 4 and 5 preventing the members 3 and 2 separating apart when they are separated to their fullest extent.

If desired the cushion rings 9 and 10 may be dispensed with the plate 8 being made curved to correspond to the shape of the rings and the upper portion of the casing thickened at the top corner to correspond to the shape of the upper ring 10. A suitable valve and flexible connection may also be provided such as shown at 16 for supplying air to the ball 11.

From this description it will be seen that I have devised a very simple form of shock absorber which will gradually absorb any shock, which is simple and cheap in construction, and in which there will be no tendency to blow out.

What I claim as my invention is:

1. A shock absorber comprising upper and lower cylindrical members adapted to be secured to the opposing portions of a vehicle and telescoping one within the other, a plate resting upon the upper edge of the lower telescoping member, a ball cushion inserted in the upper telescoping member and resting upon the plate, and opposing cup ring members, one member being held in the upper end of the upper telescoping member and the other cup ring member carried by the plate at the opposite side of the ball cushion.

2. A shock absorber comprising an upper cylindrical member and a lower cylindrical member having vertical slots and adapted to be secured to the opposing portions of a vehicle and telescoping one within the other, a pneumatic cushion inserted between the telescoping members, and screw members inserted through the upper telescoping member and having extensions extending into the vertical slots of the lower telescoping member.

ARTHUR GEORGE WITT.

Witnesses:
  GERTRUDE NICHOLSON,
  LAURA BOWRON.